United States Patent Office 3,001,314
Patented Sept. 26, 1961

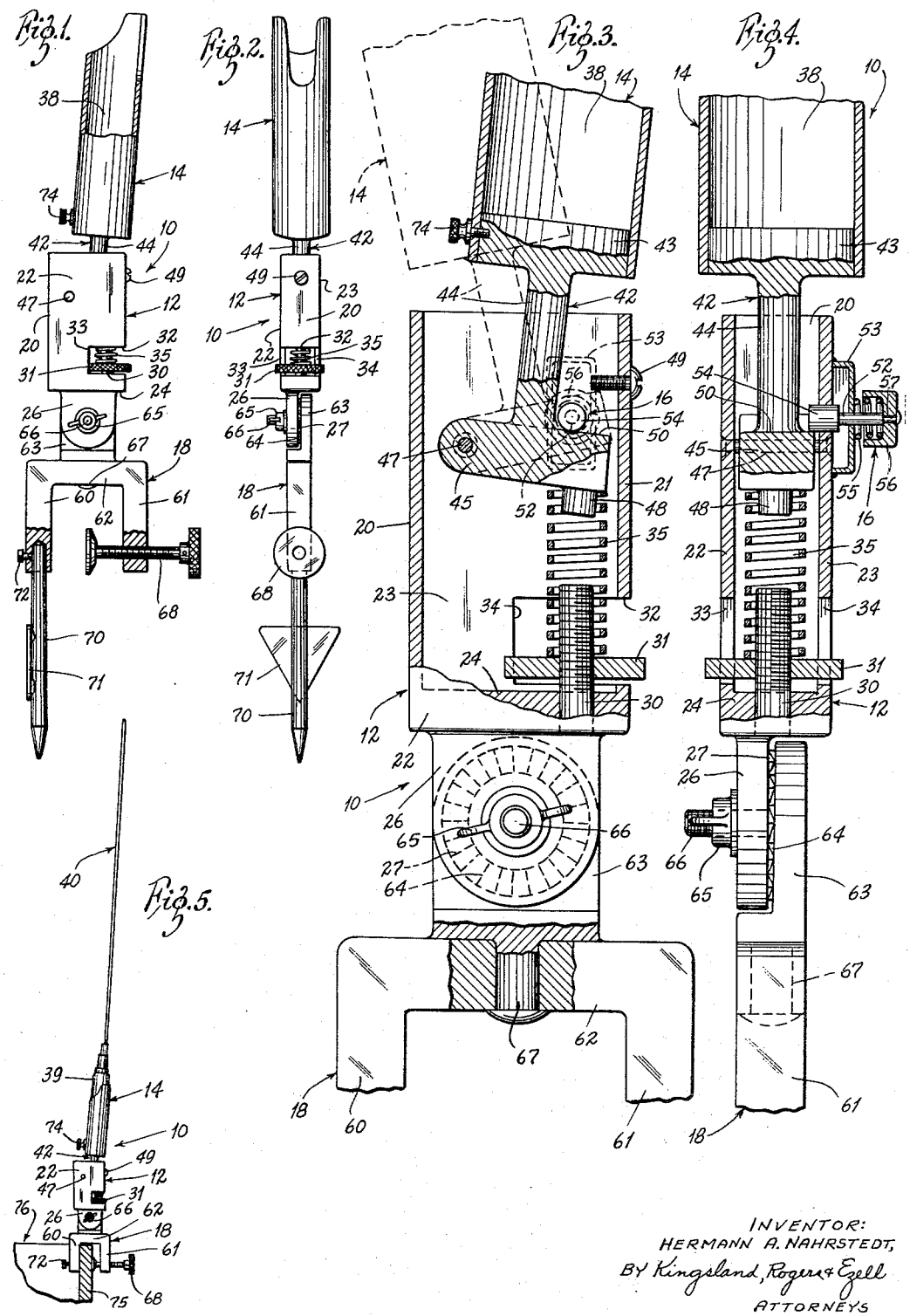

3,001,314
FISHING ROD HOLDER
Hermann A. Nahrstedt, 8619 Green Springs Drive,
Affton 23, Mo.
Filed Nov. 10, 1958, Ser. No. 772,969
1 Claim. (Cl. 43—15)

The present invention relates generally to fishing devices, and more particularly to a holder for fishing rods which includes releasable spring actuated mechanism for automatically hooking a fish.

In brief, the present novel fishing rod holder includes a supporting member which pivotally receives a rod holding member. The rod holding member is spring biased to one extreme position of movement and is maintained in the other normal position of movement against the force of the spring by a spring actuated releasable locking pin. A clamp is adjustably connected to the supporting member for mounting the fishing rod holder upon a boat, or other support. In addition, an anchoring dowel is removably connected to the clamp for mounting the fishing rod holder in upright position in the ground.

An object of the present invention is to provide a novel fishing rod holder of the automatic fishhooking-type which is of a simplified construction, thereby eliminating complicated procedures for mounting the holder and for setting it in operative position.

Another object is to provide a novel fishing rod holder of the automatic fishhooking-type which incorporates a frictionally retained spring actuated locking means and positive quick acting construction for hooking a fish immediately following a tug on the line caused by a bite.

Another object is to provide a novel fishing rod holder of the automatic fishhooking-type which will snap the line to the rear immediately following the usual tug occasioned by a bite, thereby being highly effective in automatically hooking fish.

Another object is to provide a novel fishing rod holder of the automatic fishhooking-type which includes means for selectively mounting the holder upon the side of a boat, or the like, or in upright position in the ground adjacent fishing waters.

Other objects are to provide a novel fishing rod holder of the automatic fishhooking-type which is relatively inexpensive, which is positive in action, which permits the user to perform other tasks without losing fishing time, which can be readily employed by fishermen with minimum instruction, which requires little mechanical ability to employ, and which otherwise fulfills the objects and advantages sought therefor.

The foregoing and other objects and advantages are apparent from the following description taken with the accompany drawing, in which:

FIGURE 1 is a side elevational view of a fishing rod holder embodying the principles of the present invention, parts being broken away for clarity of illustration;

FIGURE 2 is a front elevational view thereof;

FIGURE 3 is an enlarged fragmentary view, partly in section, showing the central part of the fishing rod holder;

FIGURE 4 is an enlarged fragmentary view similar to FIGURE 3, but at ninety degrees thereto, parts being in section; and FIGURE 5 is a side elevational view illustrating the fishing rod holder clamped to the side of a boat, a fishing rod, less reel, being mounted in the rod holding member.

Referring to the drawing more particularly by reference numerals, 10 indicates generally a fishing rod holder embodying the principles of the present invention. Broadly, the fishing rod holder 10 includes a supporting member 12, a rod holding member 14 pivotally mounted in relation to the supporting member 12, releasable locking means 16, a supporting clamp 18, and related elements.

As is clear from the drawing, the supporting member 12 is of hollow rectangular cross section and includes a rear wall 20, a front wall 21, side walls 22 and 23, and a bottom wall 24. Depending from the bottom wall 24 is a flange portion 26 having annular serrations 27. A threaded post 30 is mounted in the bottom wall 24 in vertical position and threadedly receives an adjusting nut 31 which is of a size to extend outwardly of the front wall 21 and the side walls 22 and 23 through openings 32, 33 and 34 provided therein, as is clear from the drawing. A compression spring 35 is mounted on the threaded post 30 for a purpose described below.

The rod holding member 14 is of the configuration shown in the drawing and includes a socket 38 which receives the handle portion 39 of a fishing rod 40 (FIGURE 5). The rod holding member 14 includes a depending mounting element 42 having an upper disc portion 43 closing the bottom of the rod holding member 14, a stem portion 44, and a base portion 45 which extends forwardly and rearwardly of the stem portion 44. A pivot pin 47 extends through the rearward part of the base portion 45 and is mounted in suitable openings in the walls 22 and 23 of the supporting member 12, thereby pivotally mounting the rod holding member 14, as is clear from FIGURES 1 and 3. Depending downwardly from the lower side of the front part of the base portion 45 is a boss 48 which receives the upper portion of the compression spring 35. A stop screw 49 is threadedly mounted in the front wall 21 in a position for engagement by the upper face 50 of the front part of the base portion 45 to limit rearward pivotal movement of the rod holding member 14 in relation to the supporting member 12.

The locking means 16 releasably maintains the rod holding member 14 in the full line position of FIGURE 3. The locking means 16 includes a reciprocatably mounted pin 52 mounted for movement in an opening in a suitable cup 53 secured to the wall 23 of the supporting member 12 (FIG. 4). The pin 52 has an enlarged cylindrical head 54 which is mounted for reciprocative movement in a suitable opening in the side wall 23 and in operative locking position extends inwardly of the side wall 23 into a position overlying a portion of the top face 50 of the front part of the base portion 45, as is clear from FIGURES 3 and 4. A compression spring 55 is mounted about the pin 52 and within a cap 56 mounted on the free end of the pin 52, as by a reduced peened-over portion 57. One end of the compression spring 55 engages against the outer surface of the cup 53 and the other interiorly of the cap 56. The enlarged cylindrical head 54 is maintained in engagement with the base portion 45 as a aforesaid by the upwardly exerted force of the compression spring 35, which is much more powerful than the spring 55.

The supporting clamp 18 is of U-shape, and includes legs 60 and 61 and a bight portion 62. An attaching flange 63 is pivotally connected to the bight portion 62 by an integral annular portion 67 which is peened over as shown, and includes annular serrations 64 corresponding to the serrations 27 of the flange 26. A suitable wing nut 65 and bolt 66 are provided for adjustably maintaining the flange 26 and the flange 63 in selected operative relation. The bolt 66 may be integral with the flange 63, as shown, or separate therefrom. The leg 61 threadedly receives a clamping assembly 68 of usual type. The leg 60 has an end axial opening therein which receives the upper end of a shore anchoring dowel 70 which is of spike form and includes a triangular web 71 welded thereto for purposes of preventing rotation when driven into the ground. A suitable setscrew 72 is provided for maintaining the dowel 70 releasably in the end of the leg 60.

A line drag post 74 is mounted in the base of the holding rod member 14. A line on a reel on the rod 40 is locked down around the post 74, which will materially reduce free unwinding when a fish is hooked.

In use, the fishing rod holder 10 is mounted, for example, upon the side 75 of a boat 76, as indicated in FIGURE 5. The locking means 16 is then set with the elements in the positions of FIGURES 3 and 4. The rod holding member 14 will be tilted forwardly in the full line positions of FIGURES 3 and 4, since the spring 35 is much stronger than the spring 55. However, upon a tug upon the line of the fishing rod 40 mounted in the rod holding member 14, as by the bite of a fish attempting to take bait, the rod holding member 14 will be momentarily pivoted further forwardly from the position of FIGURES 3 and 4 against the spring 35, whereupon the physical engagement between the enlarged head 54 and the upper face 50 of the base portion 45 will be relieved. Instantly, the spring 55 will act to move the pin 52 and its head 54 to the right (FIG. 4) out of the path of the base portion 45. Thereupon, the heavy spring 35 becomes effective to snap the rod holding member 14 from the full line position to the dotted line position, as shown in FIGURE 3. This action automatically hooks the fish, which may then be reeled in.

The adjusting nut 31 provides for adjustment of the heavy spring 35. It is, of course, desirable to adjust the effect of the spring 35 to the type of fishing. Where small fish are involved, a light tug should release the locking means 16, whereas in fishing for larger fish a heavier tug should be required. Adjustment of the adjusting nut 31 provides for this difference.

It is manifest there has been provided a novel fishing rod holder which achieves the objects and advantages sought therefor.

It is to be understood that the foregoing description and the accompanying drawing have been given by way of illustration and example. It is also to be understood that changes in form of the elements, substitution of equivalent elements, and rearrangement of parts, which will be readily apparent to those skilled in the art, are contemplated as within the scope of the present invention, which is limited only by the claim which follows.

What is claimed is:

In combination, a fishing rod holder comprising a supporting member of hollow rectangular cross section, a fishing rod holder member including a socket portion, a stem connected to the lower end of said socket and a transversely extending head secured to the lower end of said stem, said holder member being mounted on the supporting member in such a manner that the stem and the head extend downwardly thereinto, means pivotally connecting one end of the head to the supporting member at one side of the longitudinal axis of the stem, locking means including a pin slidably mounted in the supporting member and adapted to releasably engage the head at a point thereon remote from the pivot pin so as to hold the same in one position of movement, said pin being spring biased into an inoperative position out of contact with said head, a cap member mounted on the pin and disposed exteriorly of said rod supporting member for setting said locking means, spring means disposed in said support member and engaging the head for snapping said fishing rod holding member from a locked position wherein the pin engages the head to an unlocked position upon said pin being moved to its inoperative position and means within said supporting member for adjusting the effective force of said spring means.

References Cited in the file of this patent

UNITED STATES PATENTS

| | | |
|---|---|---|
| 2,461,356 | Sus et al. | Feb. 8, 1949 |
| 2,551,996 | Cherubini | May 8, 1951 |
| 2,781,600 | McDonnell | Feb. 19, 1957 |
| 2,835,065 | Schwartzkope | May 20, 1958 |
| 2,843,962 | Porter | July 22, 1958 |